March 18, 1930.  P. W. DIETER  1,750,925
LOCK NUT
Filed Feb. 1, 1927
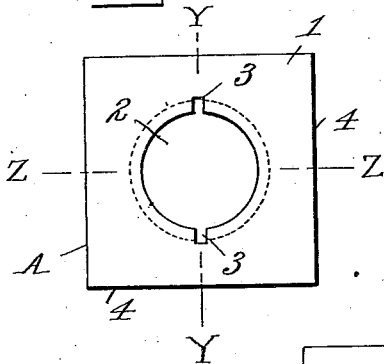
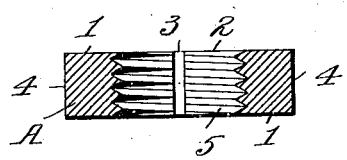
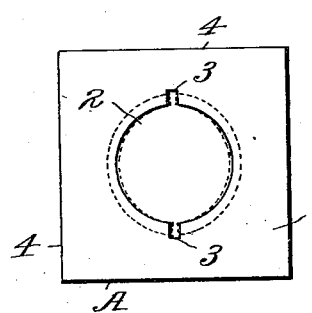
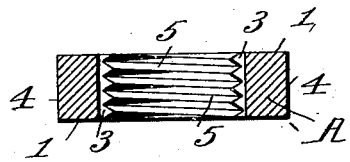
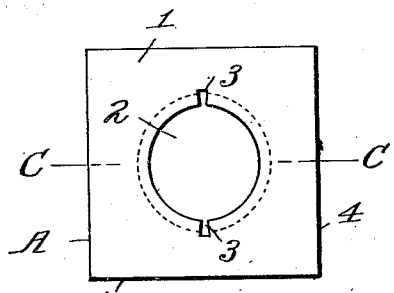
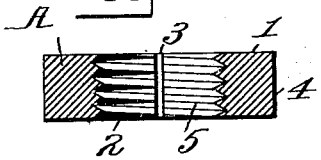
Inventor,
Paul W. Dieter
By his Attorney
Wm A. Courtland Patented Mar. 18, 1930

1,750,925

UNITED STATES PATENT OFFICE

PAUL W. DIETER, OF NEW YORK, N. Y.

LOCK NUT

Application filed February 1, 1927. Serial No. 165,133.

This invention relates to improvements in lock nuts of the kind that will be self-locking or binding, without being dependent upon any auxiliary devices or expedients, when practically applied to its component member.

The object of the present invention is to produce a nut that will have all the advantages of a standard nut, plus the merits of a lock nut, at the same time produce a lock nut that will meet the accepted standards set for practicability of operation and economy of production.

Another object of the invention is to make a lock nut that will not depend upon an abutment to effect the required locking action, that is, having a portion of the nut first abut some member to gradually cause the threads to become deformed or to throw the bolt out of axial alinement, but will have any or all of its threads self-locking upon its component member.

The important feature of this invention resides in changing the contour of the bore of the nut, after said nut has been cut, punched and threaded in the standard manner. Changing the contour of the bore of the nut is accomplished by punching a plurality of axial grooves entirely through said nut, then transversely compressing the body of said nut until the axial grooves are partially closed, causing the threaded bore of said nut to become slightly elliptical in contour, so that when the threads on the bolt are forced into engagement with the deformed threads of the nut, said nut will be firmly held on the bolt in the desired position.

In the accompanying drawings:

Figure 1 is a plan view of the nut before it is compressed.

Figure 2 is a transverse section of the same on the line Z—Z of Figure 1.

Figure 3 is a plan view of the nut after it is compressed.

Figure 4 is a transverse section of the nut on the line Y—Y of Figure 1.

Figure 5 is a plan view of the nut showing the same before compression in full lines and after compression in dotted lines.

Figure 6 is a transverse section of the nut on the line C—C of Figure 3.

In the construction and application of this invention the standard form of nut blank A is used, here shown as square. The first operation on the nut blank A is to punch therein in the usual manner between the working faces 1—1, the central bore 2, after which said nut has a plurality of axial grooves 3 punched, cut or otherwise made through the body thereof between the bore 2 and the sides 4 of the nut. The blank is now in condition to be screw threaded in the manner shown at 5.

After the nut blank has been punched, the axial grooves cut therethrough and the nut threaded in the usual manner, the sides 4 of said nut are engaged by any suitable means, such as co-acting members, two of which move towards each other in a manner to transversely compress the blank to partially close the axial grooves and make the threaded bore slightly elliptical in form. It should be understood that the threaded bore of the nut is reduced in diameter in only one transverse direction the opposite transverse direction retaining its original size. The means employed to hold the nut while it is being compressed and the axial grooves closed will prevent the threaded bore from widening beyond its original diameter.

It is not necessary to have the axial grooves of predetermined depth or width to effect the intended purpose, but practical demonstrations of the results to be obtained have proven that the proportions shown are best suited to accomplish the intended purpose.

By making, in the manner and the proportions shown, the threaded bore of the nut elliptical, a uniform and definite locking value is obtained from all threads of said nut when it is applied to the bolt.

This improved nut in its general formation and configuration, conforms in every particular to the recognized standard as to size, pitch and form.

The elliptical formation of the threads does not prevent said nut from being readily applied to the end of a bolt, and with sufficient grip to permit the immediate and free use of a wrench. The nut can be indefinitely applied to and removed from the bolt without effecting the permanency of its locking efficiency.

I claim:

A lock nut having a threaded bore therethrough, said nut further having a pair of diametrically opposite grooves extending the length of the nut, said grooves opening into said bore and being of a width and depth approximating the depth of the threads, the sides of the nut being compressed transversely to the grooves to make a portion at least of the bore slightly elliptical in form and the threads of said portion substantially continuous circumferentially.

PAUL W. DIETER.